No. 786,380. PATENTED APR. 4, 1905.
C. A. PIERCE.
THREAD GUIDE FOR SPINNING FRAMES.
APPLICATION FILED OCT. 20, 1904.
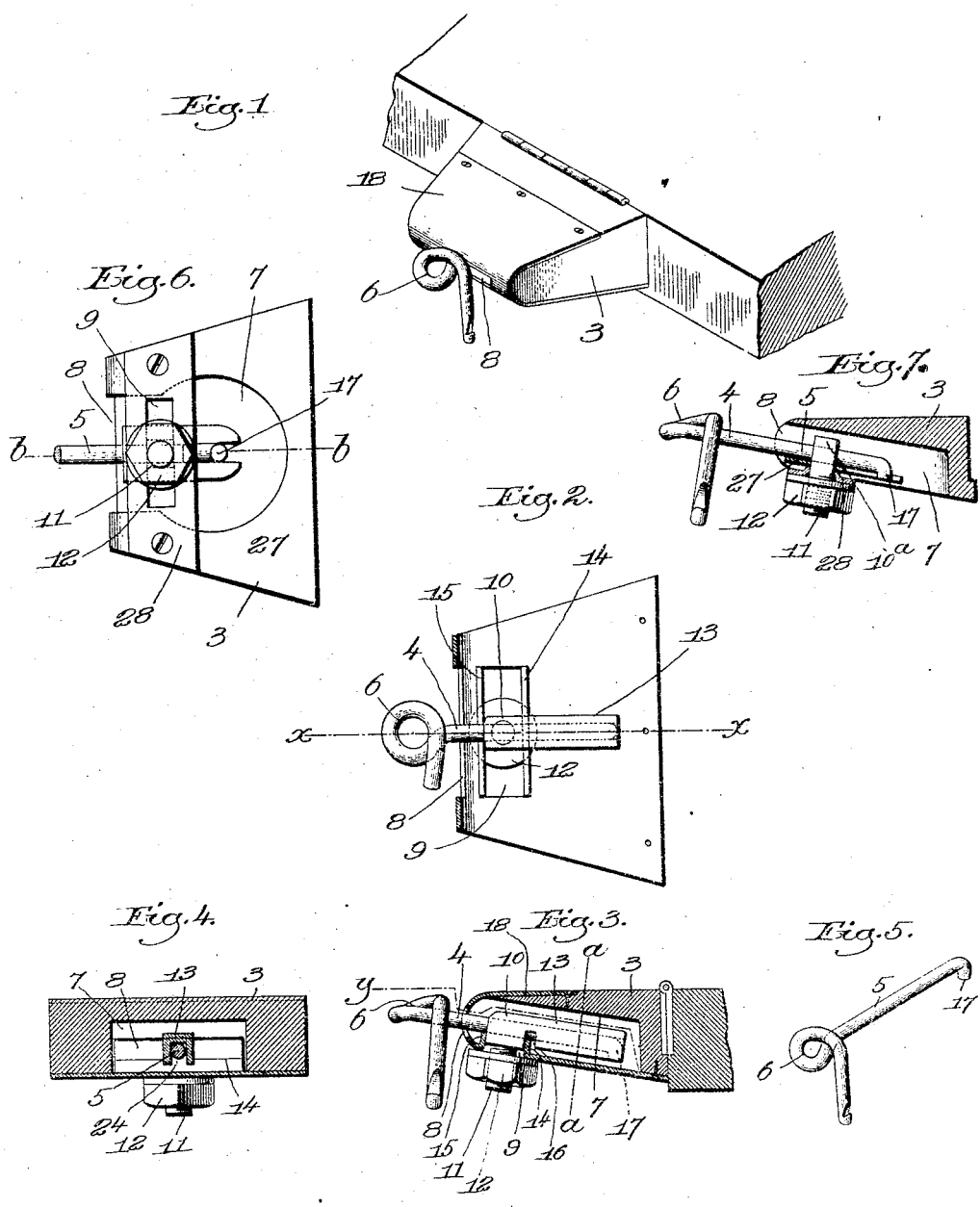

No. 786,380.

Patented April 4, 1905.

UNITED STATES PATENT OFFICE.

CLARENCE A. PIERCE, OF MANCHESTER, NEW HAMPSHIRE.

THREAD-GUIDE FOR SPINNING-FRAMES.

SPECIFICATION forming part of Letters Patent No. 786,380, dated April 4, 1905.

Application filed October 20, 1904. Serial No. 229,211.

*To all whom it may concern:*

Be it known that I, CLARENCE A. PIERCE, a citizen of the United States, residing at Manchester, county of Hillsboro, and State of New Hampshire, have invented an Improvement in Thread-Guides for Spinning-Frames, of which the following description, in connection with the accompanying drawings, is a specification, like letters on the drawings representing like parts.

This invention relates to thread-guides for spinning-frames, and especially to the means for securing the thread-guide to the finger-head. The construction of thread-guide most commonly used is one having a screw-threaded shank provided with a guide-eye at one end, said screw-threaded shank being screwed into a wooden finger-head which is usually hinged to a flange or rail forming part of the spinning-frame. This construction, however, permits of no adjustment of the thread-guide to bring the eye thereof directly over the end of the spindle. Another form of thread-guide which is sometimes used is one which is supported in the finger-head for adjustment toward and from the front of said head or out and in, and while this form of thread-guide can be adjusted in one direction no provision is made for any lateral adjustment thereof, and when lateral adjustment is found necessary it has been common practice to bend the shank of the thread-guide to bring the guide-eye into position vertically over the spindle. These guide-eyes are very often coated with enamel to prevent the thread from wearing the metal of the thread-guide, and the bending of the shank laterally is almost certain to crack the enamel, thus making rough places on the interior surfaces of the guide-eye in which the yarn catches.

My improved thread-guide is made capable of adjustment both toward and from the front of the finger-head and also laterally thereof, and the adjustment laterally is in parallel lines, as distinguished from a swinging lateral movement. By thus making the thread-guide capable of bodily movement laterally in parallel lines it is possible to adjust said thread-guide so as to bring its guide-eye into the desired position without giving to the guide-eye any turning movement. This I regard as one of the important features of my invention.

Other features of my invention relating to the thread-guide and the manner of clamping it to the finger-head will be more fully hereinafter described and then pointed out in the claims.

Figure 1 is a perspective view of one of the finger-heads of a spinning-frame, showing one form of my improved guide-eye applied thereto. Fig. 2 is a section on the line $y\ y$, Fig. 3. Fig. 3 is a section on the line $x\ x$, Fig. 2. Fig. 4 is a section on the line $a\ a$, Fig. 3. Fig. 5 is a view of the thread-guide removed from the finger-head. Fig. 6 is a bottom plan view of a finger-head, showing a modified form of my invention. Fig. 7 is a section on line $b\ b$, Fig. 6.

3 designates the usual finger-head, which is hinged to the spinning-frame in the ordinary way, and 4 is the thread-guide which is sustained by said finger-head, said thread-guide having the shank portion 5 and the guide-eye 6, which latter may be coated with enamel, if desired. The finger-head is provided with a central cavity 7 and with an elongated thread-guide-receiving aperture 8, leading to said cavity through the front of the finger-head, and another elongated aperture, 9, also leading to said cavity through the bottom of the finger-head. Within the cavity of the finger-head is a clamping member adapted to embrace the shank of the thread-guide, and in which said thread-guide is adjustable toward and from the front of the finger-head, said clamping member itself being laterally adjustable in the finger-head. With this construction the lateral adjustment of the thread-guide is effected by adjusting the clamping member laterally in the finger-head, and the adjustment of said thread-guide toward and from the finger-head is effected by moving the thread-guide relative to the clamping member.

In the form of my invention shown in Figs. 2, 3, and 4 the clamping member 10 is constructed with a screw-threaded stem or neck 11, which extends through the aperture 9 and has a clamping-nut 12 thereon and also with a clamping-arm 13, which is provided with a suitable groove 24 to receive the shank 5 of the thread-guide. The finger-head is provided each side of the aperture 9 with upturned flanges 14 and 15. The flange 15 engages the front end of the clamping member 10, and the flange 14 is received in a notch or slot 16, extending across the bottom of the clamping member. It will be observed that with this construction the tightening up of the clamping-nut 12 will draw the shank of the thread-guide hard down onto the flanges 14 and 15, and because the flange 14 sits in a slot in the clamping member said clamping member is not permitted to have any turning movement. The slot 9, however, permits said clamping member to be moved bodily laterally of the finger-head, and such movement is in parallel lines. In other words, in every adjusted position of the clamping member the arm 13 extends at the same angle from the slot 9.

It is desirable that the guide-eye 6 should always have the same horizontal position in its different adjusted positions, and to maintain this same horizontal position of the guide-eye I have provided means for preventing the thread-guide from turning about the shank as an axis. This is accomplished by providing the end of the shank with the downturned lip 17, which by its engagement with the walls of the groove 24 prevents the thread-guide from turning in its shank. This lip 17 by its engagement with the flange 14 also prevents the thread-guide from being entirely withdrawn from the finger-head.

In the embodiment of my invention above described the finger-head is made of wire, and the thread-guide-receiving aperture 8 and also the aperture 9 is formed in a sheet-metal facing-piece 18, which is shaped to fit over the front and bottom of said finger-head, the flanges 14 and 15 being formed by turning up portions of said facing member.

In Figs. 6 and 7 I have illustrated a slightly different form which my invention may embody. In this embodiment of my invention the clamping member 10$^a$ has no rearwardly-extending arm 13, which serves to prevent the thread-guide from turning, as shown in Figs. 2, 3, and 4. Instead said clamping member 10$^a$ merely has a hole through which the shank 5 of the thread-guide is inserted and a threaded stem 11, extending through the slot 9, said stem 11 having the clamping-nut 12 thereon. The front and rear side of the clamping member 10$^a$ is made flat, so that said member is prevented from turning in the slot 9.

To prevent the thread-guide from turning in the clamping member, I have in this form of my invention provided a forked member 27, which lies beneath the shank of the thread-guide and between the branches of the fork of which the downturned lip 17 of the thread-guide shank is received. In this form of my invention the slot 9 is formed in a bridge-plate 28, which spans the cavity 7 on the under side of the finger-head 3.

From the above it will be seen that I have devised a construction in which the thread-guide can be adjusted toward and from the front of the finger-head in the clamping member, but is held by the clamping member from any turning movement which will throw the guide-eye out of its proper position and also that the clamping member, with the thread-guide carried thereby, can be laterally adjusted in the finger-head, but is held by said finger-head from having any swinging movement.

By means of the above construction the guide-eye 6 is always maintained in its proper horizontal position regardless of the adjusted position of the thread-guide as a whole, and said thread-guide may be adjusted both laterally and toward and from the finger-head, as found necessary for bringing the guide-eye into the proper position.

I am aware that numerous changes may be made in the construction of the parts without departing from my invention, and I therefore reserve the right to make all such changes as come within the scope of the appended claims.

One advantage of the construction above described is that an ordinary wooden finger-head into which the shanks of the thread-guides are screw-threaded can be easily and with a minimum expense changed over into a finger-head embodying my invention, the operation of thus equipping said finger-head with my invention involving merely providing said wooden finger-heads with the cavity 7 and assembling the various parts of the clamping device within said cavity.

Having fully described my invention, what I claim as new, and desire to secure by Letters Patent, is—

1. In a thread-guiding means for spinning-frames, a finger-head, a thread-guide separate therefrom and carried thereby, and adjustable means to clamp the thread-guide to the finger-head, said means permitting the thread-guide to be adjusted laterally on the finger-head in parallel lines.

2. In a device of the class described, a hinged finger-head, a thread-guide carried thereby, said thread-guide having a shank, and adjustable clamping means to engage said shank, said clamping means permitting the thread-guide to be adjusted on the finger-head in lines parallel to the shank.

3. In a device of the class described, a finger-head, a thread-guide provided with a shank, and a clamping member engaging the shank and adapted to clamp said thread-guide to the finger-head, said clamping member being adjustable laterally of the finger-head.

4. In a device of the class described, a finger-head, a thread-guide having a shank, and a clamping member engaging said shank and adapted to clamp the thread-guide to the finger-head, said clamping member being adjustable laterally of the finger-head, and the thread-guide being adjustable in the clamping member toward and from the front of the finger-head.

5. In a device of the class described, a finger-head having a cavity, and a thread-guide-receiving slot leading to said cavity, a thread-guide extending through said slot, and a clamping member within the cavity and engaging said thread-guide, the clamping member being adjustable laterally in the cavity.

6. In a device of the class described, a finger-head having a cavity and a thread-guide-receiving slot leading to said cavity, a thread-guide extending through said slot, a clamping member within the cavity and engaging said thread-guide, the clamping member being adjustable laterally in the cavity, and the thread-guide being adjustable in the clamping member toward and from the front of the finger-head.

In testimony whereof I have signed my name to this specification in the presence of two subscribing witnesses.

CLARENCE A. PIERCE.

Witnesses:
ELLIOT C. LAMBERT,
E. B. WORTHEN.